US009432814B2

(12) United States Patent
Castmo

(10) Patent No.: US 9,432,814 B2
(45) Date of Patent: Aug. 30, 2016

(54) TRACKING AREA LIST HANDLING

(75) Inventor: Thomas Castmo, Vastra Frolunda (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/414,841

(22) PCT Filed: Jul. 16, 2012

(86) PCT No.: PCT/EP2012/063865
§ 371 (c)(1),
(2), (4) Date: Jan. 14, 2015

(87) PCT Pub. No.: WO2014/012568
PCT Pub. Date: Jan. 23, 2014

(65) Prior Publication Data
US 2015/0163637 A1    Jun. 11, 2015

(51) Int. Cl.
*H04W 24/00* (2009.01)
*H04W 4/02* (2009.01)
(Continued)

(52) U.S. Cl.
CPC ............. *H04W 4/028* (2013.01); *H04W 4/021* (2013.01); *H04W 60/00* (2013.01); *H04W 4/04* (2013.01); *H04W 68/00* (2013.01)

(58) Field of Classification Search
CPC .................................................... H04W 4/028
USPC ...................................................... 455/456.1
See application file for complete search history.

(56) References Cited

U.S. PATENT DOCUMENTS

2008/0248822 A1\* 10/2008 Jarvinen ................. H04W 4/02
455/509
2009/0088156 A1\* 4/2009 Aaron ................... H04W 36/32
455/436

(Continued)

FOREIGN PATENT DOCUMENTS

| EP | 2 180 729 A1 | 4/2010 |
|---|---|---|
| WO | 2012/050491 A1 | 4/2012 |

OTHER PUBLICATIONS

PCT International Search Report, mailed Mar. 7, 2013, in connection with International Application No. PCT/EP2012/063865, all pages.

(Continued)

*Primary Examiner* — Santiago Garcia
(74) *Attorney, Agent, or Firm* — Leffler Intellectual Property Law, PLLC

(57) ABSTRACT

There is provided a method for a mobility management node (MME) and a mobility management node for collecting mobility data of user entities, UEs, in a mobile communication network comprising a plurality of cells, wherein at least one cell or a group of cells are forming a tracking area, TA, in which paging of a given UE may be undertaken. At least the mobility management node is adapted for holding a TA list for a given UE defining a larger paging area in which paging may be performed throughout the area and in which TA update need not be undertaken by the UE in question before moving out of said area; the UE being required to perform a TA update procedure if moving out of the larger paging area. The method comprises: continuously registering mobility events pertaining to a plurality of UE's in the network, wherein for each of the plurality of UE's: assigning a link strength indicative of the frequency at which UE's are travelling a link in question; and building a table of links and associated link strengths in the network. The method further comprises for a given UE when performing a TA update procedure and upon moving from a second source TA to a second target TA: investigating based on at least the location of at least one of the source TA and the target TA; one or more probable travel paths potentially comprising a series of interconnected links and originating in either the source TA or the target TA; the probable travel paths being selected by taking into account the strength of the associated links in the table; the probable travel paths moreover being selected by taking into account the limit of a TA list length applying for the UE in question; and generating a TA list comprising the TA's constituted by the probable travel paths.

18 Claims, 11 Drawing Sheets

(51) Int. Cl.
*H04W 60/00* (2009.01)
*H04W 4/04* (2009.01)
*H04W 68/00* (2009.01)

(56) References Cited

U.S. PATENT DOCUMENTS

| | | | | |
|---|---|---|---|---|
| 2010/0323715 | A1* | 12/2010 | Winters | G01S 5/0027 455/456.1 |
| 2011/0294524 | A1* | 12/2011 | Tontinuttananon | H04W 60/00 455/458 |
| 2012/0064908 | A1* | 3/2012 | Fox | H04W 28/10 455/452.2 |
| 2012/0129517 | A1* | 5/2012 | Fox | H04L 41/5025 455/425 |
| 2012/0178468 | A1* | 7/2012 | Jeong | H01Q 23/00 455/452.1 |
| 2012/0294278 | A1* | 11/2012 | Wang | H04W 28/18 370/331 |
| 2013/0344842 | A1* | 12/2013 | McDonald | H04W 4/028 455/404.2 |

OTHER PUBLICATIONS

PCT Written Opinion, mailed Mar. 7, 2013, in connection with International Application No. PCT/EP2012/063865, all pages.
3GPP TS 23.401, V11.2.0 "General Packet Radio Service (GPRS) enhancements for Evolved Universal Terrestrial Radio Access Network (E-UTRAN) access (Release 11)", Jun. 2012, pp. 1-285.
3GPP TS 24.301, V11.3.0 "Non-Access-Stratus (NAS) protocol for Evolved Packet System (EPS); Stage 3 (Release 11)", Jun. 2012, pp. 1-335.

* cited by examiner

TRACKING AREA LIST HANDLING

TECHNICAL FIELD

This invention relates to the field of handling tracking area information in telecommunication networks. More particularly, the invention relates to providing user entities with optimized traffic area information.

BACKGROUND

For LTE EPC (Long Term Evolution Evolved packet Core) a Tracking Area, TA, corresponds to the Routing Area (RA) used in Wideband Code Division Multiple Access (WCDMA) and GSM/Edge Radio Access Network (GERAN). The TA consists of a cluster of RBSs having the same Tracking Area Code (TAC). The TA provides a way to track UE locations in idle mode. TA information is used by the Mobility Management Entity (MME) when paging idle UE's to notify them of incoming data connections.

If the UE moves out of the TA it must signal to the network and perform TA Update. This is done so the network can limit the area of which to page the UE in case of downlink data in idle mode. Otherwise the MME would have to page the entire network. Paging is generally seen as a resource demanding operation.

For LTE EPC systems the standards 3GPP TS23.401 and TS24.301 suggests the possibility for an MME to send a list of TA's during TA Update for which a UE may roam without signaling to the network. In LTE, the MME provides the UE with a list of tracking areas where the UE registration is valid. When the MME pages a UE, a paging message is sent to all radio base stations associated with the TA list.

First when the UE roams outside the TA area defined by the TA list, a TA update, TAU, is performed. A short TA list affects the UE negatively as it must perform TAU more often when moving. A large TA list will reduce the signaling based from the UE since it doesn't need to perform TA update so often and will therefore save power for the UE. However, a large TA list creates a higher signaling load for the network in case the UE needs to be paged since paging must be done in a larger area.

A trade-off in list length may be chosen. As a practical solution, a list length of e.g. 15 may be selected for LTE EPC systems. One possible implementation is to collect the trace of 15 recent visited TA's for a given UE, arrange those TA's in a list for the UE which then define the paging area.

The Tracking Area Update, TAU, procedure with Serving GW change is explained in 3GPP TS 23.401, 3GPP TS 23.401 V11.2.0 (2012-06), chapter 5.3.3.1, c.f. fig. FIG. 5.3.3.1-1: Tracking Area Update procedure with Serving GW change showing among other signal 3, TAU request from U to MME and signal 20 TAU Accept from MME to UE.

SUMMARY OF THE INVENTION

It is a first object of the invention, to limit paging signaling load in a network while at the same time secure power optimized UE operation and safe and swift paging.

This object has been accomplished by a method for a mobility management node for collecting mobility data of user entities, UEs, in a mobile communication network comprising a plurality of cells, wherein at least one cell or a group of cells are forming a tracking area, TA, in which paging of a given UE may be undertaken. At least the mobility management node is adapted for holding a TA list for a given UE defining a larger paging area in which paging may be performed throughout the area and in which TA update need not be undertaken by the UE in question before moving out of said area; the UE being required to perform a TA update procedure if moving out of the larger paging area.

The method comprising the steps of
continuously registering mobility events pertaining to a plurality of UE's in the network, wherein for each of the plurality of UE's,
extracting a first source TA, that is, the TA a given UE visited, and a first target TA, that is, a TA to which the given UE is moving,
registering a link defined by the extracted first source TA and the first extracted target TA;
assigning a link strength indicative of the frequency at which UE's are travelling a link in question;
building a table of links and associated link strengths in the network.

The method further comprises for a given UE when performing a TA update procedure and upon moving from a second source TA to a second target TA;
investigating, based on at least the location of at least one of the second source TA and the second target TA; and one or more probable travel paths potentially comprising a series of interconnected links and originating in either the second source TA or the second target TA;
the probable travel paths being selected by taking into account the strength of the associated links in the table;
the probable travel paths moreover being selected by taking into account the limit of a TA list length applying for the UE in question;
generating a TA list comprising the TA's constituted by the probable travel paths.

A further aspect of an embodiment of a method of the invention involves:
updating at least a mobility list weight parameter for the mobility behaviour of a UE, and
generating the TA list length for the UE according to the updated mobility list weight parameter, such that a mobility list weight which is larger than a predetermined value generates a first TA list length while a mobility list weight which is smaller than said predetermined value generates a second TA list length being shorter than the first TA list length.

The above mentioned object of limiting paging signaling load in the network while at the same time secure power optimized UE operation and safe and swift paging is further accomplished by a mobility management node MME comprising a processing unit, a memory and an interface unit, the mobility management node being adapted for collecting mobility data of user entities, UEs, in a mobile communication network comprising a plurality of cells, wherein at least one cell or a group of cells are forming a tracking area, TA, in which paging of a given UE may be undertaken.

The mobility management node is further adapted for holding a TA list for a given UE defining a larger paging area in which paging may be performed throughout the area and in which TA update need not be undertaken by the UE in question before moving out of said area; the UE being required to perform a TA update procedure if moving out of the larger paging area.

The mobility management node is further being adapted for
continuously registering mobility events pertaining to a plurality of UE's in the network, wherein for each of the plurality of UE's, extracting a first source TA, that is, the TA a given UE visited, and a first target TA, that is, a TA to which the given UE is moving, registering a link defined by the extracted first source TA and the first extracted target TA;

assigning a link strength indicative of the frequency at which UE's are travelling a link in question;

building a table of links and associated link strengths in the network.

The mobility management node further being adapted to, for a given UE when performing a TA update procedure and upon moving from a second source TA to a second target TA;

investigating, based on at least the location of at least one of the second source TA and the second target TA; and one or more probable travel paths potentially comprising a series of interconnected links and originating in either the second source TA or the second target TA; the probable travel paths being selected by taking into account the strength of the associated links in the table; and the probable travel paths moreover being selected by taking into account the limit of a TA list length applying for the UE in question.

Moreover, the mobility management node is further being adapted to, —generating a TA list comprising the TA's constituted by the probable travel paths.

In another embodiment, the mobility management node MME is, adapted for updating at least a mobility list weight parameter for the mobility behaviour of a UE, and generating the TA list length for the UE according to the updated mobility list weight parameter, such that a mobility list weight which is larger than a predetermined value generates a first TA list length while a mobility list weight which is smaller than said predetermined value generates a second TA list length being shorter than the first TA list length.

According to one aspect of the invention, the mentioned table can be seen as a self organizing table that is provided "automatically"—over time—and which adapts to changes in the network.

According to a further aspect of the invention—the TA lists corresponds to "look ahead" TA lists, which takes into account the present direction of movement of a user entity.

DETAILED DESCRIPTION

For LTE EPC (Long Term Evolution Evolved packet Core) systems the standards 3GPP TS23.401 and TS24.301 suggests the possibility for an MME to send a list of TA's during TA Update for which a UE may roam without signaling to the network. In an internal reference design of the applicant, an MME is configurable to use one of two different methods:

Add the new TA into the previous TA list, this produces a trail of where the UE has been.

Query a DNS with the TA that the UE moves into and retrieve a TA list.

An embodiment of the invention comprises two main aspects, where the first, I, is to collect statistics regarding movements of UE's and to build a table of relations between TA's. Typically, the relations concern neighbouring TA's, i.e. the table is a relation between TA's that are adjacent. This table is later used in a second aspect II, e.g. in runtime, to generate a UE specific TA list.

A further embodiment involves, in addition to the two aspects above, a third aspect III in which the size or length of a TA list for a given UE is generated. The third aspect concerns generating a TA list for the given UE based on the generated TA list length. In the following the three parts will be dealt with under sections I, II and III. By way of example, TA_2, TA_3, TA_4 and TA_6 define a TA list defining an area, TA_LIST_AREA 2.

I

Figure 1:
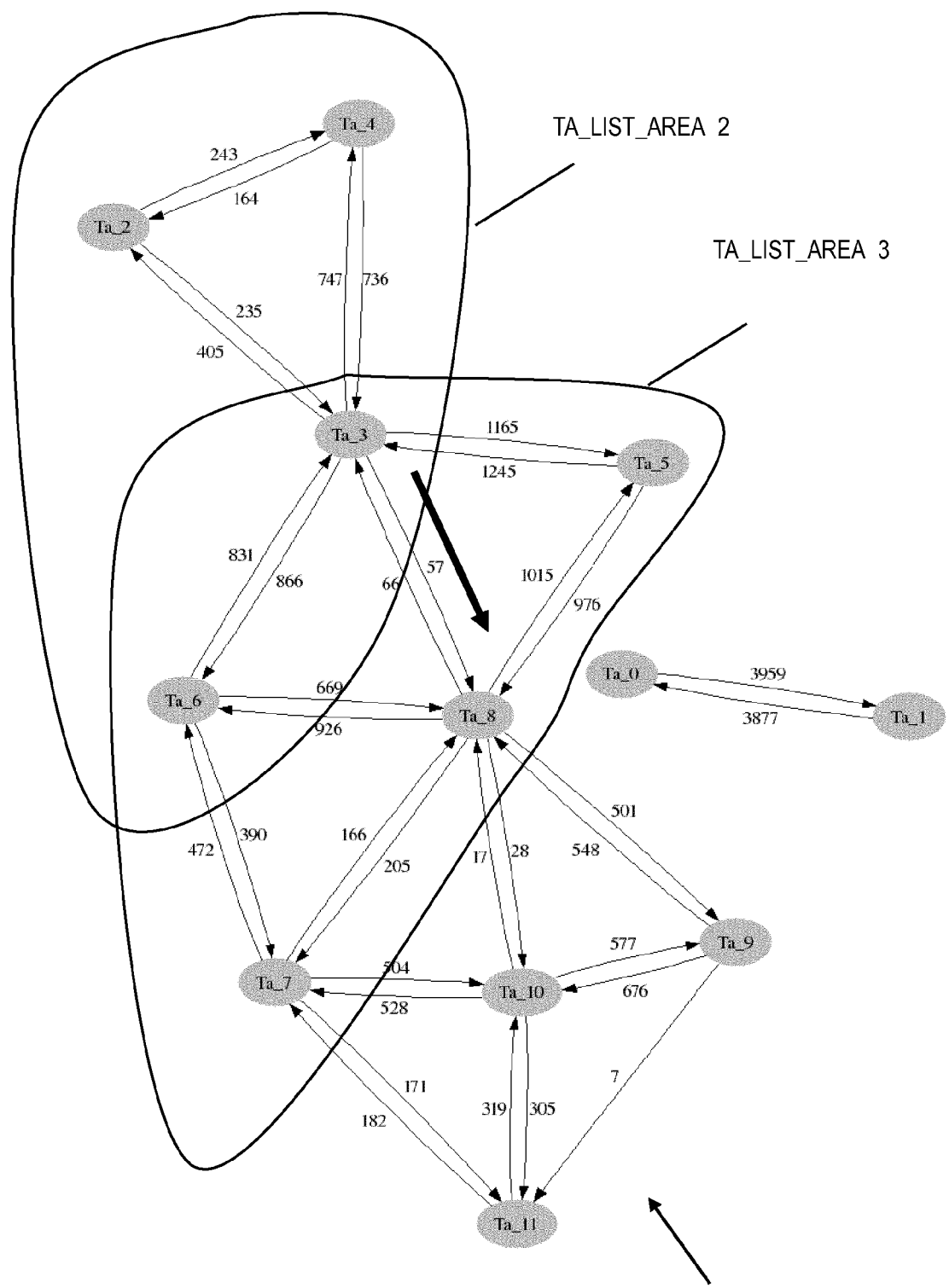
FIG. 1 shows an exemplary prior art network of traffic areas (TA) between which the frequency of user entity (UE) traffic routes are indicated.

FIG. 1 shows a network 1 of traffic areas TA between which the frequency of user entity UE traffic routes—also denoted link strengths—are indicated. Hence FIG. 1 shows a TA relation table. For example for the TA denoted TA_2 the strength associated with the link pointing to TA_3 is 235, while strength of the link in the opposite direction is 405. FIG. 1 indicates many more TA's and link strengths which shall not be dealt with further here. As long as the UE moves within the TA area, e.g. defined by TA_LIST_AREA 2, there is no need for TA update and the UE can be paged inside this area. However, when moving out of the area, e.g. from TA_3 to TA_8, TA update is performed and a new TA list applies which defines a corresponding TA_LIST area, e.g. TA_LIST_AREA 3.

According to a first aspect of the invention, a "background" routine is harvesting log events and filters out events that involves mobility between TA's and from that building a table that represents the relations between neighbouring TA's (TA-RELATION-TABLE).

The TA-RELATION-TABLE consists of entries that may have the following format:

{SOURCE_TA (key), Links} where Links is a list of entries with the format:

{TARGET_TA, Strength} where the parameter strength is an integer representing how likely an UE moves to this TA.

The TA-RELATION-TABLE may have the following format:

| SOURCE_TA | TARGET_TA | Strength |
|---|---|---|
| TA_2 | TA_3 | 235 |
|  | TA_4 | 243 |

When the function finds an event that involves mobility between TA's then the function determines where an UE moved from SOURCE_TA and where the UE moved to TARGET_TA. The algorithm then checks the TA-RELATION-TABLE if there is an entry for the SOURCE_TA already. If there is no entry then the entry is added and the links column is populated with the TARGET_-TA. If there exists an entry for SOURCE_TA then the algorithm checks if Links contains TARGET_TA, and if not the TARGET_TA is added to Links. If Links contains TARGET_TA then that entry is updated and the strength is increased by 1. The end result consists of a table with as many entries as there are TA's served by the MME and each entry will consist of links of which UE's moves to after being served by the respective TA.

Before a link is added to an entry, a consistency check is made to ensure that the SOURCE_TA and TARGET_TA are consistent with regards to local MME configuration. This ensures that the links in the table are consistent and that the run-time code that generates TA-list can rely on all links and hence a consistency check in run-time is not needed. TA lists must be consistent with regard to using the same time zone, served by same SGW, etc. As a result, if local configuration changes happen, that affects the TA consistency; the TA-RELATION-TABLE must be flushed and re-built in order to avoid inconsistency. This however should only have effect for a limited time after reconfiguration and involves only a temporary increase in signaling load until the table is re-built.

Figure 2:
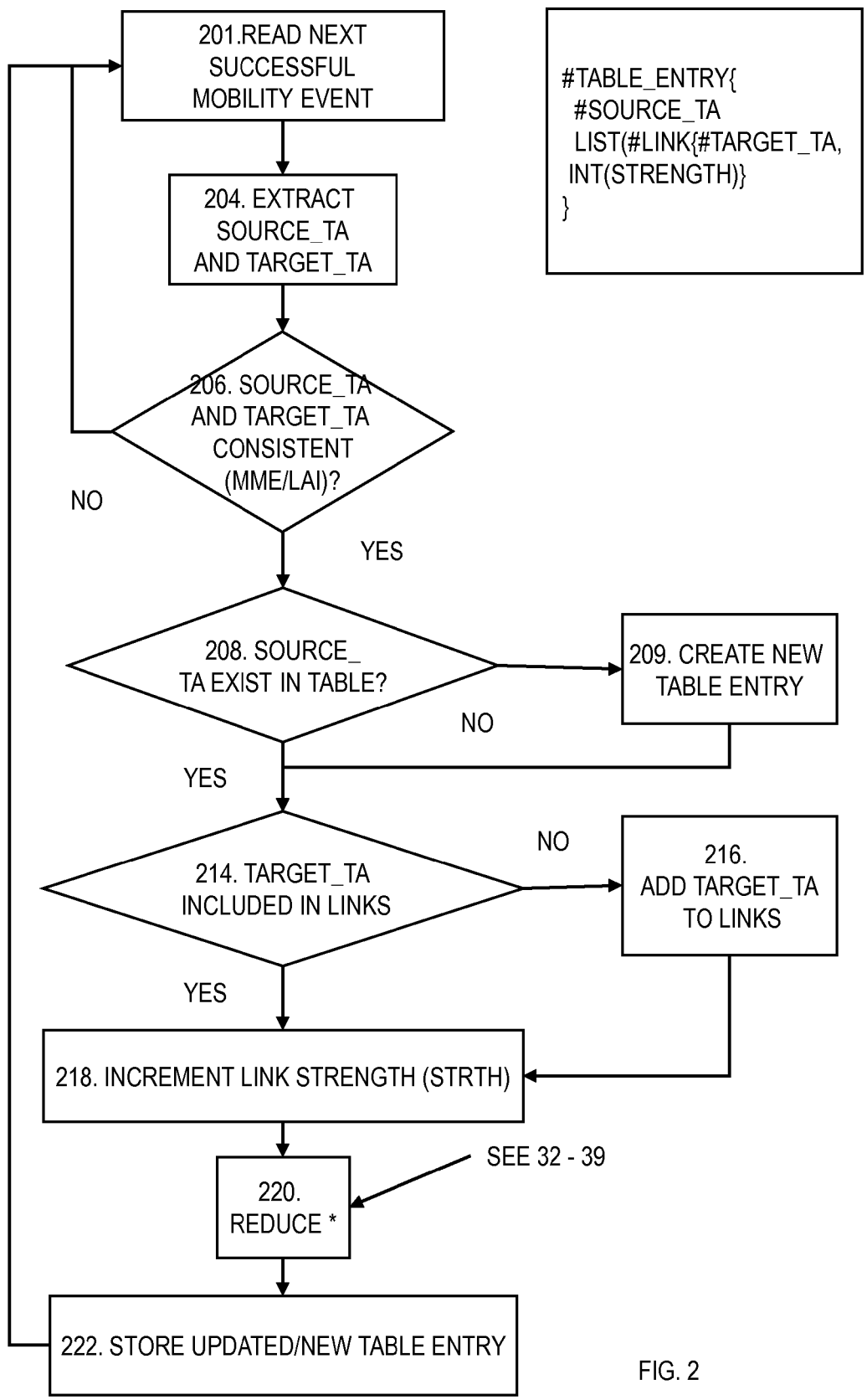
FIG. 2 is a flow diagram relating to a first embodiment according to the invention for collecting statistics in a type of network as shown in FIG. 1.

FIG. 2 is a first flow diagram relating to a first embodiment according to the invention for collecting statistics in a type of network as shown in FIG. 1.

In step 201 a next successful mobility event is read. In step 204, the source TA, SOURCE_TA, and the target TA, TARGET_TA, is extracted. In step 206, it is investigated whether the source and the target TA are consistent, that is, whether at least one of the following is fulfilled: e.g. the same MME, same LAI, same time zone etc.. If no, the method moves to 201, if yes, it moves to 208, in which it is investigated whether the source TA exists in the table. If yes, in 208, the method goes to 214 in which it is investigated whether the target TA is included in a link. If no, in 208, a new table entry is created in step 209, whereupon the method goes to 214.

In 214 it is investigated whether the target TA is included in a link. If no, 216, the target TA is added to links, if yes, the method goes to 218. If yes in 214, the method goes directly to 218.

In 218, the link strength is incremented by a number e.g. 1. Thereupon, all links in the network may be reduced, 220.

Finally, in step 222, the values/new table entry are stored/updated.

Figure 3:
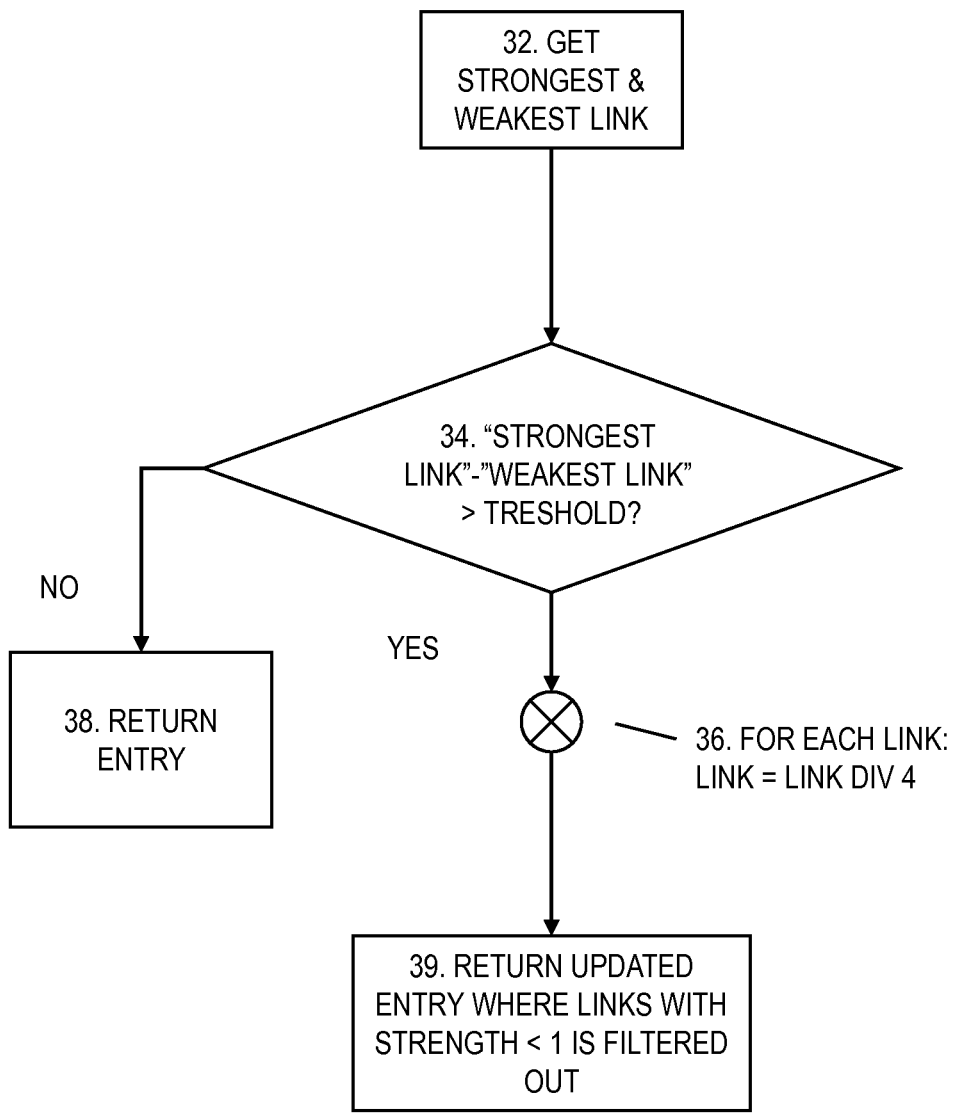
FIG. 3 shows further details of some of the steps in FIG. 2.

In FIG. 3, an embodiment of the reduction step 220 is illustrated in more detail. The strongest and the weakest link are acquired, 32, and it is investigated 34 whether the difference between the strongest and the weakest link exceeds a predefined threshold. If no, 38, the method returns. If yes, the method moves to 36, in which each link is divided by a configurable factor, e.g. 4. Then after 36, in 39, the links are updated for all entries and links with strength<1 are filtered out.

It is seen that the reduction step 220 prevents the strength values increasing indefinitely and prevents virtually non-trafficked links from populating the table.

II

In run-time the TA-RELATION-TABLE is used as input when generating the TA list and an algorithm that searches the table in a sort of linked-list manner is used to find the most likely moving pattern.

Figure 4:
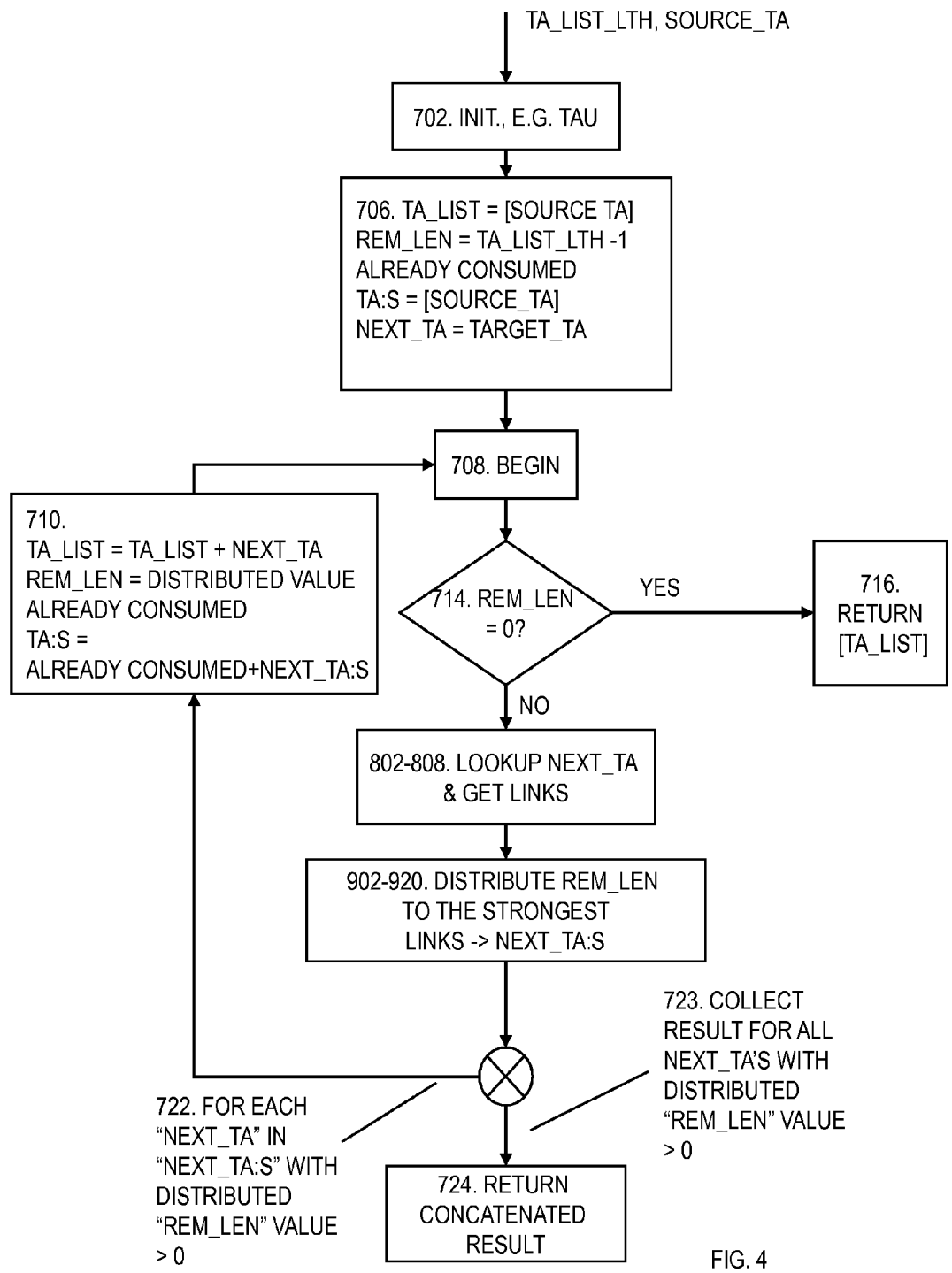
FIG. 4 is a flow diagram relating to a first embodiment for calculating a TA list for a given user entity according to the invention.

In FIG. 4, a flow diagram relating to a first embodiment of such an algorithm for calculating a TA list for a given user entity according to the invention, is shown. Input parameters for the moving UE are a list length, TA_LIST_LTH—which could be fixed—and the source TA. It is noted that the terms source TA and target TA are different values from those in part I where the mobility of UE's affects the building of the relation table.

In step 702, the method starts as initiated by a TA update, e.g. when the MME is issuing a TAU accept to the UE. In step 704, it is checked whether the source TA and the target TA has a relation. If yes, the method goes to 706.

In 706, a parameter denoted TA-LIST includes SOURCE_TA and a parameter REM_LEN, indicative of a remaining TA list length, is set equal to TA_LIST_LTH minus 1. The source TA is included in a set of already consumed TA's, and a parameter NEXT_TA is set equal to the target TA.

From 706 the method moves to 708 and further to 714, where it is investigated whether REM_LEN is zero. If yes, the method returns with the TA list, TA_LIST, step 716. If no, steps 804-808 are undertaken corresponding to a look-up next TA and get links and steps 902-920 distribute remaining links, REM_LEN, to the strongest links. Thereafter, the method proceeds to 722, wherein for each NEXT_TA in the list of NEXT_TA's with distributed REM_LEN value greater than zero. In this manner the link strength for various paths are taken into consideration for choosing the TA lists.

The TA list is presented as a concatenated result 724 by collecting results for all NEXT_TA's with distributed REM_LEN value>0—path 723—, while for each "NEXT_TA" in "NEXT_TA'S" with a distributed REM_LEN value>0 —path 722 —, the method moves to 710 where TA_LIST is set equal to TA_LIST+NEXT_TA; the REM_LEN is set to a distributed value and already consumed TA's are set equal to already consumed TA's+next TA's. Subsequently, the method moves to step 708.

Figure 5:
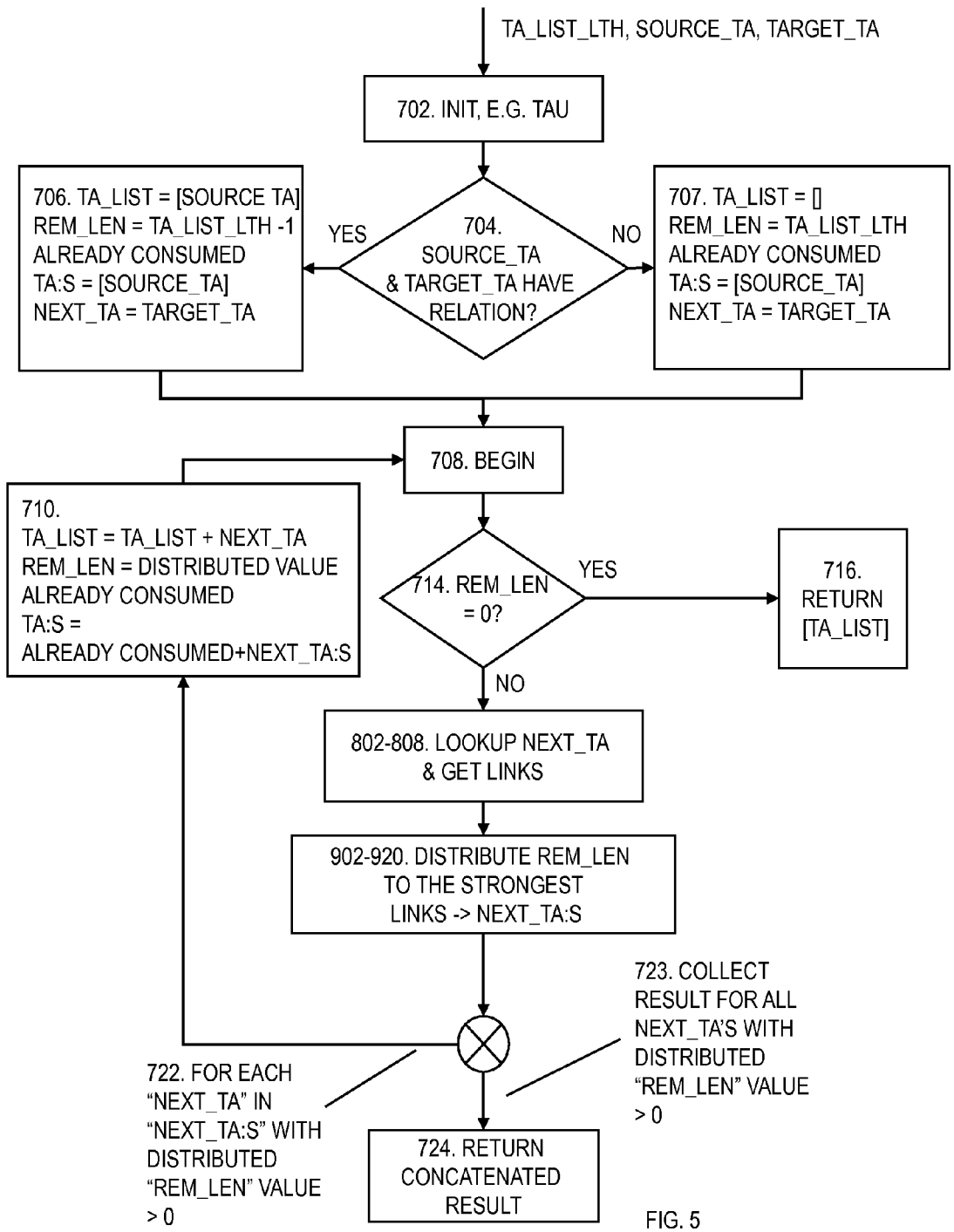
FIG. 5 is a flow diagram relating to a second embodiment for calculating a TA list for a given user entity according to the invention.

In FIG. 5, a flow diagram relating to a second embodiment of such an algorithm for calculating a TA list for a given user entity according to the invention, is shown. Input parameters for the moving UE are a list length, TA_LIST_LTH—which could be fixed—the source TA, SOURCE_TA, and also the target TA, TARGET_TA, at the instance when the UE is moving. The additional steps over the FIG. 4 embodiment shall be explained below.

In step 702, the method starts. In step 704, it is checked whether the source TA and the target TA has a relation. If yes the method goes to 706, performing the steps explained above, if no to 707.

In 707, the parameter denoted TA-LIST is set equal to no entries and the parameter REM_LEN, indicative of a remaining links, is set equal to TA_LIST_LTH. The source TA is included in a set of already consumed TA's, and a parameter NEXT_TA is set equal to the target TA. From 706 and 707 the method moves to 708 in the same manner as explained with regard to FIG. 4.

Figure 6:
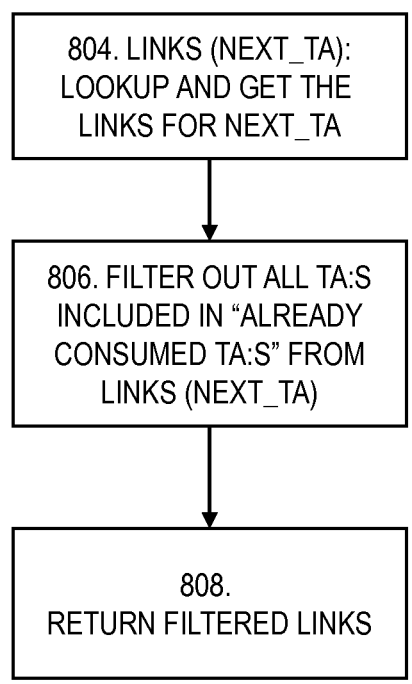
FIG. 6 shows further details of some of the steps indicated in FIGS. 4 and 5.

FIG. 6 shows step 804-808 of the preceding FIGS. 4 and 5, in which step 804, the process starts. In step 804, NEXT_TA are acquired from the table and the associated links are acquired. In 806, all TA's included in already consumed TA's are filtered out from links, and in step 808, the filtered links are returned.

Figure 7:
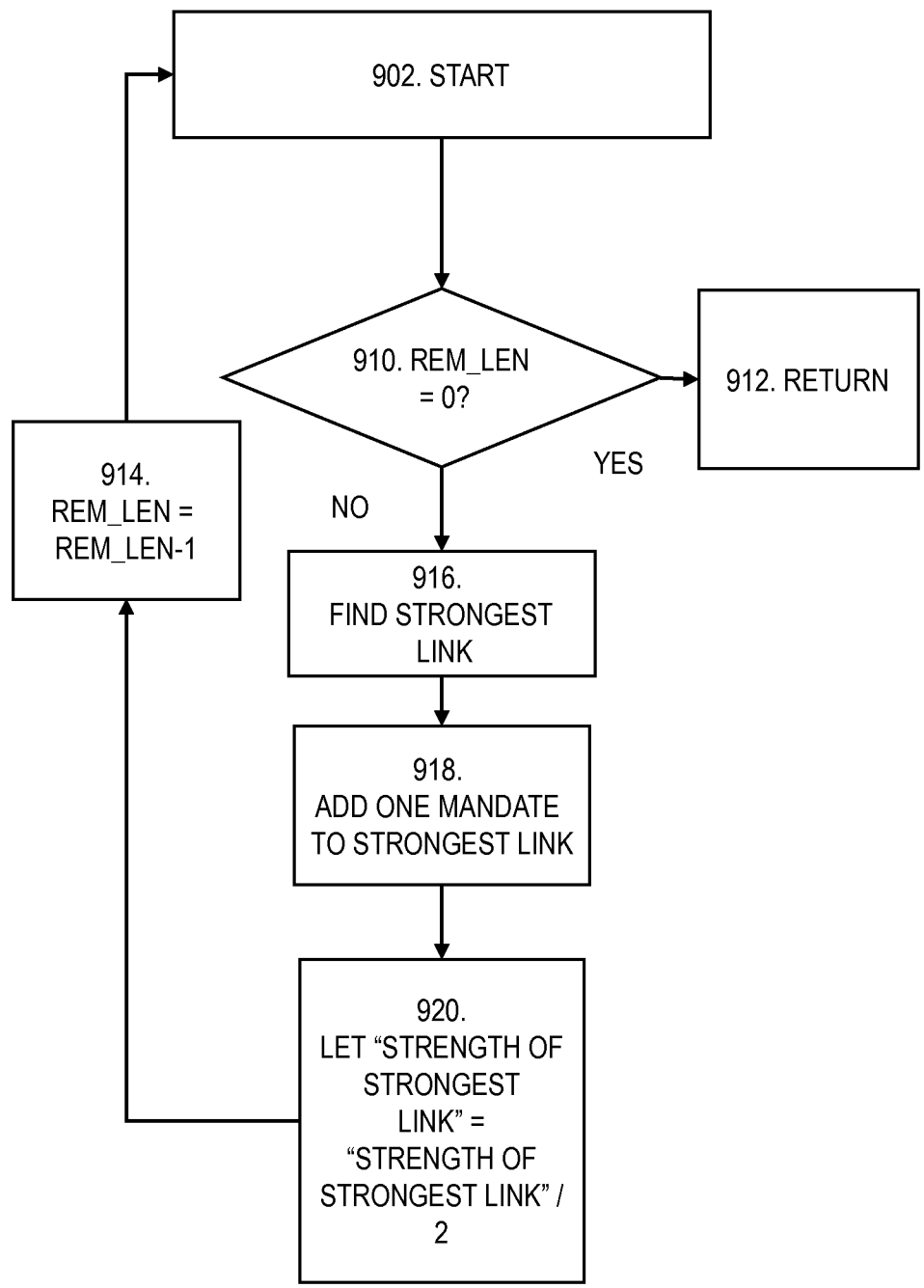
FIG. 7 shows further details of some of the steps indicated in FIGS. 4 and 5.

FIG. 7 shows an exemplary implementation of steps 902-920 of FIGS. 4 and 5. This aspect corresponds to a mandate distribution algorithm. In step 902, the process is started. In step 910 it is investigated whether parameter REM_LEN is zero, if yes, 912, the method returns, if no, the method proceeds to 916, in which the strongest link is found. Subsequently, in step 918, one mandate is added to the strongest link, i.e. the strongest link is given a right to populate the TA list, and in 920 the strength of the strongest link is set equal to the strength of the strongest link divided by two. The method proceeds to step 914 in which the parameter REM_LEN is reduced by one.

Figure 8:
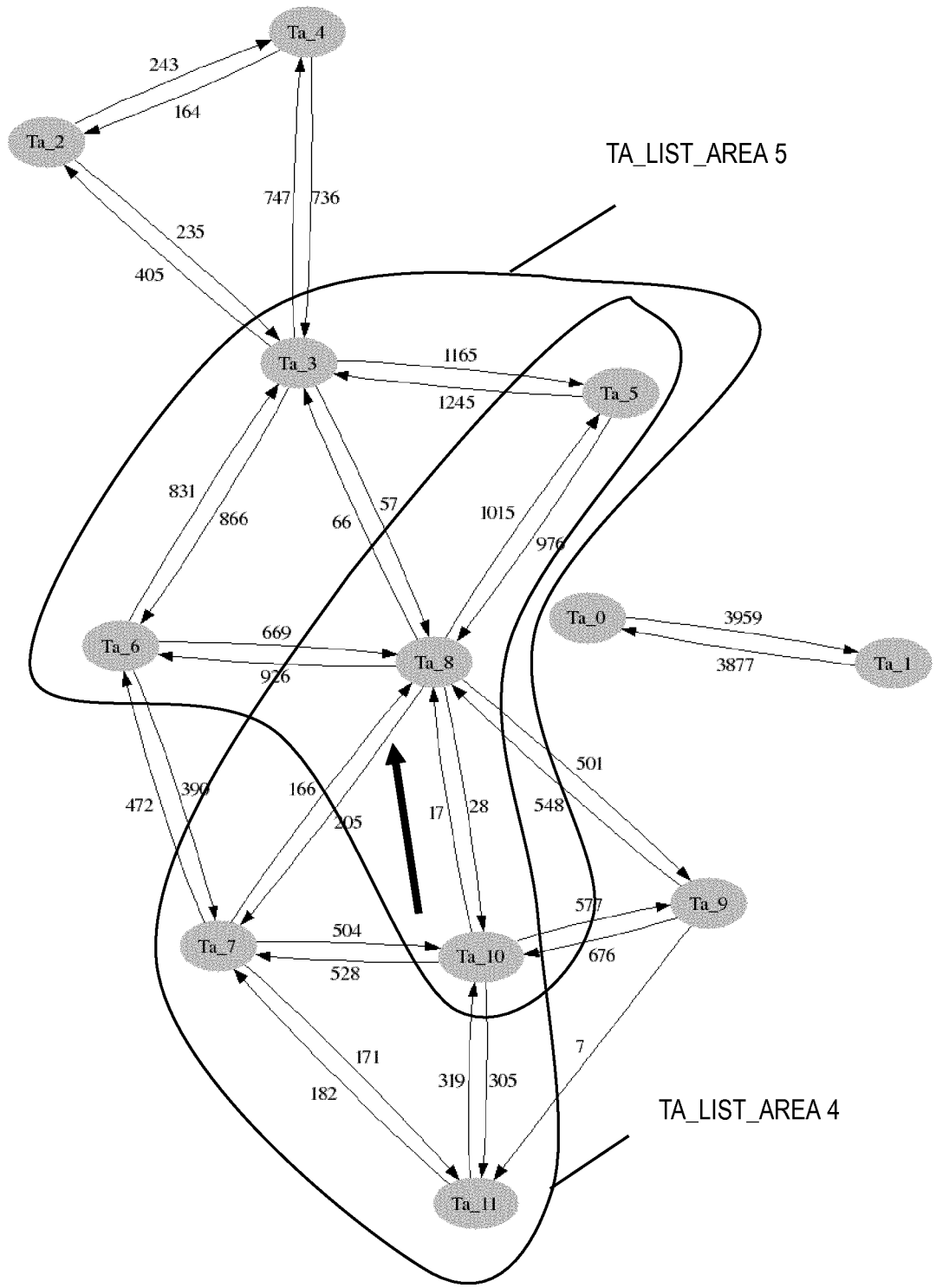
FIG. 8 shows an exemplary scenario of generated TA lists for a given UE when moving from a first TA to a second TA.

FIG. 8 shows an example when a UE moves from TA_10 SOURCE_TA to TA_8 TARGET_TA, the methods according to FIGS. 4 and 5 includes SOURCE_TA just in case the UE resides in the border between the TA's to avoid new TA update but the link strengths associated with the surrounding TA's of at least the source TA and TA's beyond that TA are evaluated used to look ahead and predict which TA's the UE will most likely enter after moving away from SOURCE_TA, TA 10.

According to the FIG. 4 embodiment, the source TA, TA_10, is taken into consideration alone. With an exemplary list length of four, a TA_LIST comprising TA_11, TA 10, TA_7, TA_8 and TA _5 is yielded defining a first TA list area TA_LIST_AREA 4. According to the FIG. 5 embodiment, the source TA, TA_10 and the target TA, TA_10, are taken into consideration. With an exemplary list length of four, a TA_LIST comprising TA _10, TA_8, TA_6, TA _5 and TA_3 is yielded defining a first TA list area TA_LIST_AREA 5. As appears, a number of paths are possible within the TA_LIST areas defined.

Hence, there is provided a method for a mobility management node MME for collecting mobility data of user entities, UEs, in a mobile communication network 1 comprising a plurality of cells, wherein at least one cell or a group of cells are forming a tracking area, TA, in which paging of a given UE may be undertaken. At least the mobility management node MME is adapted for holding a TA list TA_LIST for a given UE defining a larger paging area TA_LIST_AREA in which paging may be performed throughout the area and in which TA update need not be undertaken by the UE in question before moving out of said area; the UE being required to perform a TA update procedure if moving out of the larger paging area TA_LIST_AREA.

The method comprising the steps of
continuously 201 registering mobility events pertaining to a plurality of UE's in the network, wherein for each of the plurality of UE's,
extracting 204 a first source TA, that is, the TA a given UE visited, and a first target TA, that is, a TA to which the given UE is moving,
registering 208, 209, 214 216 a link 41, 42 defined by the extracted first source TA and the first extracted target TA;
assigning 218; 220 a link strength STRTH indicative of the frequency at which UE's are travelling a link in question;
building 222 a table of links and associated link strengths STRTH in the network.

The method further comprises for a given UE when performing a TA update procedure and upon moving from a second source TA to a second target TA;

investigating 704, 706, 707, 710, 714, 804-808, 902-920, based on at least the location of at least one of the second source TA and the second target TA 706, 707); and one or more probable travel paths NEXT_TA) potentially comprising a series of interconnected links NEXT_TA, 804-808) and originating in either the second source TA or the second target TA;

the probable travel paths being selected by taking into account the strength STRTH of the associated links in the table;

the probable travel paths moreover being selected by taking into account the limit of a TA list length TA_LIST_LTH applying for the UE in question;

generating 716 a TA list TA_LIST comprising the TA's constituted by the probable travel paths.

In one embodiment of the invention, the TA list length TA_LIST_LTH is a predetermined fixed length for all UE's in the network 1.

III

In a further embodiment of the invention, a UE specific parameter within the MME that keeps track of the relation between TA Updates and paging procedures for the UE is generated. This parameter is then used as input when generating the TA list and determines the maximum size of a TA list.

If an UE is mostly static and/or often paged then there is a benefit of making the TA list size small in order to reduce paging signaling. However if the UE is very agile, browsing the internet through a web browser (Service requested by UE) then it is more beneficial to give the UE a greater TA list since it needs to signal TA updates less often. Since this varies depending of type of UE it is good to have a UE dependent parameter that determines how large the TA size shall be and not a hard coded global value as it is in today's MME implementation.

Which type of UE it is not really important which model and/or make it is, since the aim is to reduce overall signaling across the entire node and since most UE is likely to follow the same traffic pattern as it has done previously the MME needs to store a parameter per UE that represent the UE's historical pattern. I.e. the parameter does not need to be perfectly optimized for every single scenario, as long as the overall signaling for all UE's is reduced it will give an enhancement.

Figure 9:
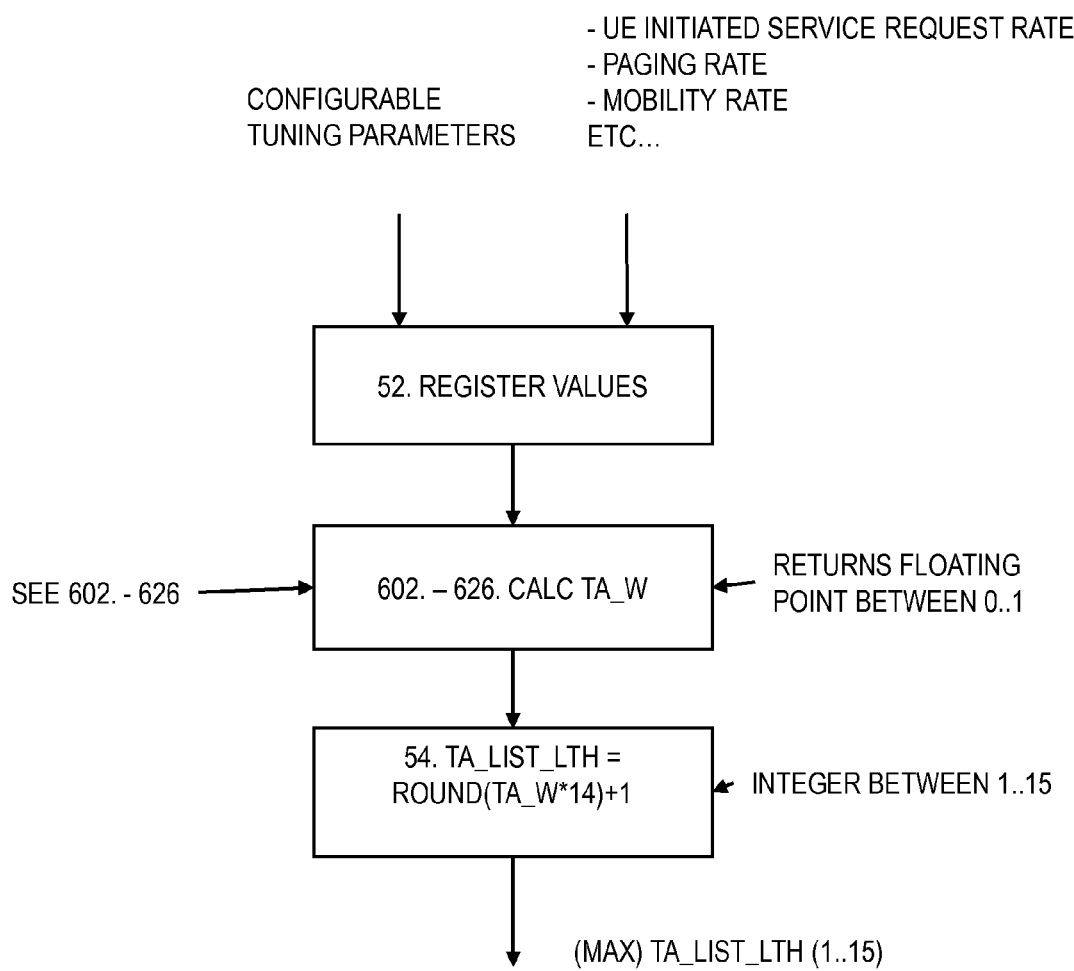
FIG. 9 is a flow diagram relating to a first embodiment for calculating a TA list length for a given user entity according to the invention.

In FIG. 9, the embodiment involves considering mobility parameters such as an UE initiated service request rate, a paging rate, a mobility rate etc. Moreover, configurable tuning parameters, such as UE initiated service request rate weight W_SR, a paging rate weight W_P, a mobility rate weight, W_TAU are provided.

From these input parameters the list length, TA_LIST_LTH is determined, such that less mobile UE's are given a relatively short list length whereas UE's which have a relatively high mobility pattern are given a high list length value.

Figure 10:
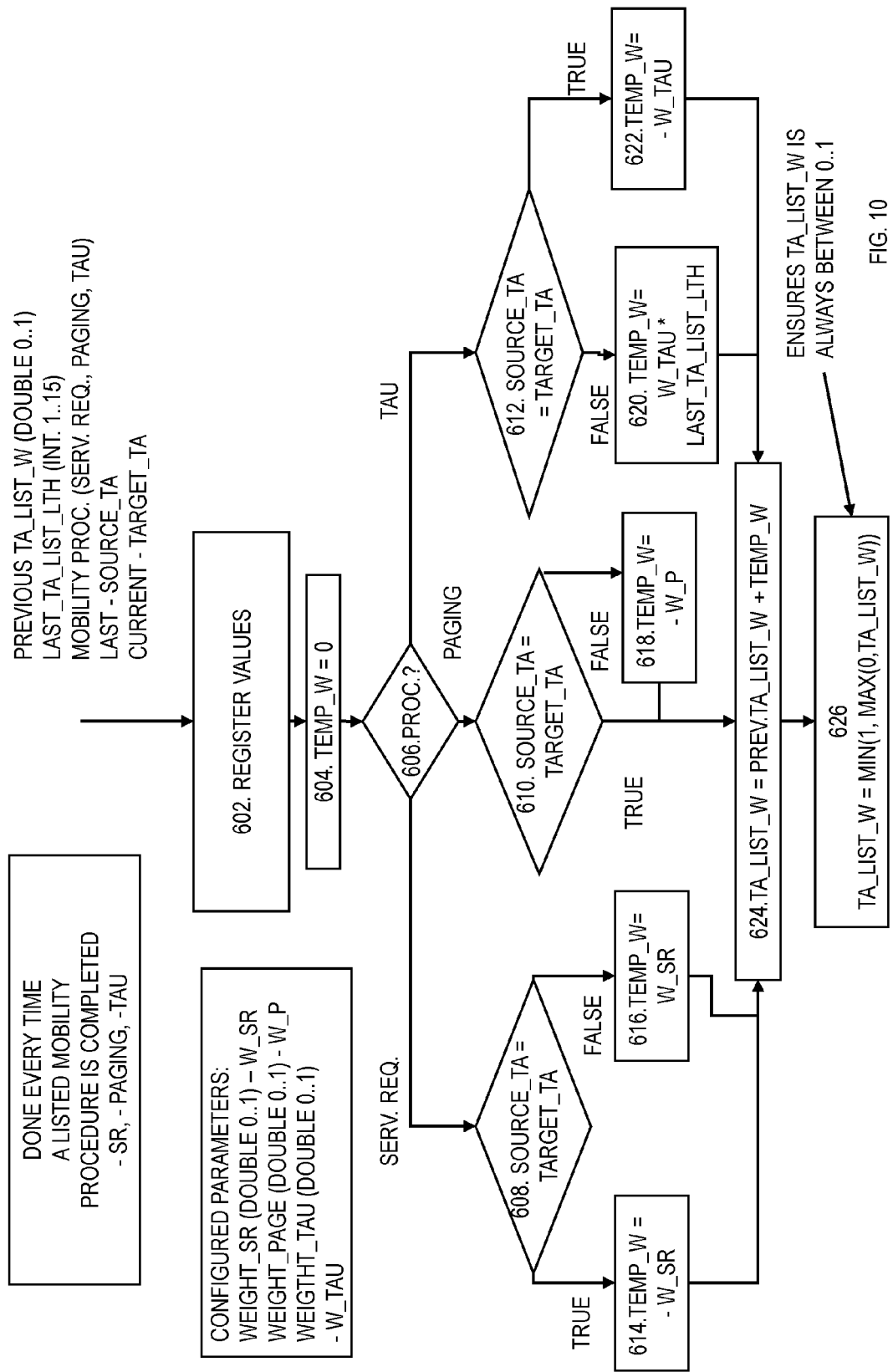
FIG. 10 shows further details of FIG. 9.

In FIG. 9, in step 52, the method registers at least some of the above input values, moves to 602-626, shown in FIG. 10, in which a mobility list weight parameter, TA_LIST_W, is calculated returning a floating point between 0 and 1. From the floating point value, a TA_LIST_LTH value is generated 54 by setting TA_LIST_LTH equal to Round of RA_W times 14 added by 1 (for a maximum list length of 15). This function provides an integer between 1 and 15 indicating the applicable list length for the UE in question.

In FIG. 10 an embodiment according to the invention of using TA weights for adjusting an appropriate TA list length is further exemplified. The method shown is carried out every time a listed mobility procedure by a UE is completed, such as when a UE initiated service request; a paging procedure or TA update procedure is initiated.

In step 602, a previous TA_LIST_W, a last TA list length, LAST-TA_LIST_LTH, the mobility procedure as mentioned above, the source TA and the target TA is registered as input parameters.

In step 604, the parameter TEMP_W is set to zero.

In step 606, the type of procedure is resolved, i.e. service request, paging or TAU, leading to steps 608, 610 and 612, respectively.

In step 608, it is investigated whether the target TA equals the source TA, that is, whether the current TA is equal to the last TA, if true 614 the parameter TEMP_W is set to W_SR and if false 616 to W_SR. If the UE has not moved outside the last TA the target TA equals the source TA.

In step 610, if the target TA equals the source TA if true, the method proceeds to step 624 and if false 618 the parameter TEMP_W is set to −W_P.

In step 612, if the target TA equals the source TA if false 624, the parameter TEMP_W is set to W_TAU*LAST_TA_LIST_LTH, and if true 622 set to −W_TAU.

Subsequently, for all the outcomes of the previous steps 614, 616, 618, 620 and 622, the method proceeds to 624 in which the TA list weight is calculated as TA_LIST_W=PREVIOUS TA_LIST_W+TEMP_W.

Next, in step 626, the TA list length is restricted according to TA_LIST_W=MIN(1, MAX(0, TA_LIST_W)), which ensures that the TA_LIST_W is always a value between 0 and 1.

Hence, there is provided by the further aspect of an embodiment of a method of the invention involving:

updating 52; 602-626 at least a mobility list weight parameter TA_LIST_W for the mobility behaviour of a UE, and generating 54 the TA list length TA_LIST_LTH for the UE according to the updated mobility list weight parameter TA_LIST_W, such that a mobility list weight TA_LIST_W which is larger than a predetermined value generates a first TA list length while a mobility list weight TA_LIST_W which is smaller than said predetermined value generates a second TA list length being shorter than the first TA list length.

The mobility list weight parameter 40 for mobility behaviour is based on at least the frequency at which a UE has completed at least one of a TA update 612;
a paging for the UE 610; or
a serving request for the UE 608.

The list length TA_LIST_LTH may further be restricted 54 to a value between 1 and a predetermined upper maximum list length.

In the following three examples for FIG. 10 is given:

Example 1: UE Initiated Service Request

In case of service request the MME determines whether the UE's current TA (the TA from which the UE initiated the service request) is equal 608 to the last TA (the TA from which the UE was the last time it was signaling from). If the current and last TA is equal, i.e. the UE has not moved and hence the weight parameter is subject to decrease, and the UE's TA_LIST_WEIGHT is updated with a lower value, 614. Subsequently, if the current and last TA is not equal the UE has moved and hence the TA_LIST_WEIGHT is updated with a higher value, 616.

Example 2: Paging Response

At paging response and if current and last TA is equal 610, the current TA list length is assumed to be stable and hence the TA_LIST_WEIGHT is not updated. However in case unequal current and last TA then the MME is likely to have paged in a wider area than necessary and the TA_LIST_WEIGHT should decrease 618 in order to produce a narrower list at next TAU.

Example 3: Tracking Area Update TAU

During a TAU procedure the MME determines if current and last TA is equal 612 and if equal then this indicates a periodic TAU (i.e. keep alive signal) and that the UE has neither moved nor signaled for a period. Hence the TA_LIST_WEIGHT is decreased 622 in order to lower the TA list length at next TA list update.

In case of current and last TA not equal 612, then this indicates that the UE has moved across the entire TA list and hence the TA_LIST_WEIGHT should increase 620 to allow for a larger TA list at next TA list update.

In summary, —at a serving request 608— if a current and last TA is not equal, that is, the UE has moved, the TA_LIST_WEIGHT is updated 616 with a higher value;

at paging 610—if a current and last TA is not equal, the TA_LIST_WEIGHT is decreased 618; and at TA update 612—in case of current and last TA not equal, the TA_LIST_WEIGHT is increased 620.

It appears from the FIG. 10 flow diagram and the examples that the list length is adapted according to the invention to the mobility behaviour of the UE in question. The provided list length is used for creating the specific TA list as explained above under II.

Figure 11:
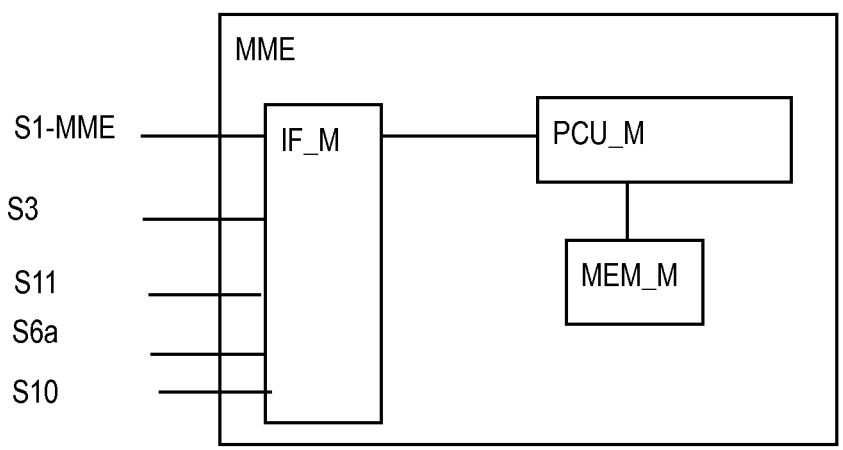
FIG. 11 shows a TA list generating node, such as a MME, according to the invention.

In FIG. 11, a mobility management node MME according to the invention is shown. The MME according to the invention comprises a central processing unit, PCU_M, a memory MEM_M and an interface unit IF_M comprising at least an S1-MME interface, a S3 interface, a S11 and a S6a interface, as well as a S10 interface. The methods according to the invention as explained above are carried out on the central processor unit PCU_M in corporation with transferring appropriate instructions held in the memory MEM_M which instructions are reflecting the method steps described. The MME may also comprise MME functionality as is known in the art, for instance as known according to the System Architecture Evolution/Long Term Evolution, SAE/LTE, standards in addition to the functionality explained in this document.

In summary, the mobility management node MME may comprise a processing unit PCU_M, a memory MEM_M and an interface unit IF_M, the mobility management node being adapted for collecting mobility data of user entities, UEs, in a mobile communication network 1 comprising a plurality of cells, wherein at least one cell or a group of cells are forming a tracking area, TA, in which paging of a given UE may be undertaken; wherein at least the mobility management node MME is further adapted for holding a TA list TA_LIST for a given UE defining a larger paging area TA_LIST_AREA in which paging may be performed throughout the area and in which TA update need not be undertaken by the UE in question before moving out of said area; the UE being required to perform a TA update procedure if moving out of the larger paging area TA_LIST_AREA; the mobility management node MME is further being adapted for continuously 201 registering mobility events pertaining to a plurality of UE's in the network, wherein for each of the plurality of UE's, extracting 204 a first source TA, that is, the TA a given UE visited, and a first target TA, that is, a TA to which the given UE is moving, registering 208, 209, 214 216 a link 41, 42 defined by the extracted first source TA and the first extracted target TA;

assigning 218; 220 a link strength STRTH indicative of the frequency at which UE's are travelling a link in question;

building 222 a table of links and associated link strengths STRTH in the network; Moreover, the mobility management node MME is further being adapted to, for a given UE when performing a TA update procedure and upon moving from a second source TA to a second target TA;

investigating 704, 706, 707, 710, 714, 804-808, 902-920, based on at least the location of at least one of the second source TA and the second target TA 706, 707; and one or more probable travel paths NEXT_TA potentially comprising a series of interconnected links NEXT_TA, 804-808 and originating in either the second source TA or the second target TA;

the probable travel paths being selected by taking into account the strength STRTH of the associated links in the table;

the probable travel paths moreover being selected by taking into account the limit of a TA list length TA_LIST_LTH applying for the UE in question;

the mobility management node MME further being adapted to, —generating 716 a TA list TA_LIST comprising the TA's constituted by the probable travel paths.

The mobility management node MME may be adapted for updating 52; 602-626 at least a mobility list weight parameter TA_LIST_W for the mobility behaviour of a UE, and generating 54 the TA list length TA_LIST_LTH for the UE according to the updated mobility list weight parameter TA_LIST_W, such that a mobility list weight TA_LIST_W which is larger than a predetermined value generates a first TA list length while a mobility list weight TA_LIST_W which is smaller than said predetermined value generates a second TA list length being shorter than the first TA list length.

For the mobility management node MME according to an embodiment of the invention, the mobility list weight parameter 40 for mobility behaviour is based on at least the frequency at which a UE has completed at least one of a TA update 612;

a paging for the UE 610; or a serving request for the UE 608.

The mobility management node MME may further being adapted for at a serving request 608—if a current and last TA is not equal, that is, the UE has moved, the TA_LIST_WEIGHT is updated 616 with a higher value;

at paging 610—if a current and last TA is not equal, the TA_LIST_WEIGHT is decreased 618;

at TA update 612—in case of current and last TA not equal, the TA_LIST_WEIGHT is increased 620.

For the mobility management node MME, it carries out the steps of the second source TA is added 704 to the TA list, if the second source TA and the second target TA has a relation, that is, a link strength value exists for the link.

The mobility management node MME may further being adapted for reducing 220 the table entries over time such that links which are used less frequent are deleted from the table. Moreover it may be adapted for, for a given next TA under investigation 802-808 and when generating 716 the TA list TA_LIST comprising the TA's constituted by the probable travel paths, examining the corresponding links and the step of finding the strongest link, and after having found such a strongest link, subsequently dividing the strongest link strength with a predetermined value 920.

The invention claimed is:

1. A method for a mobility management node (MME) for collecting mobility data of user entities (UE) in a mobile communication network comprising a plurality of cells, wherein at least one cell or a group of cells are forming a tracking area (TA) in which, when paging of a given UE is to be undertaken, paging of the given UE is undertaken;

wherein at least the mobility management node is adapted for holding a TA list for a given UE defining a larger paging area in which, when paging of the given UE is to be performed, paging is performed throughout the area and in which TA update need not be undertaken by the UE in question before moving out of said area; the UE being required to perform a TA update procedure if moving out of the larger paging area;

the method comprising:

continuously registering mobility events pertaining to a plurality of UE's in the network, wherein for each of the plurality of UE's, extracting a first source TA, being a TA a given UE visited, and a first target TA, being a TA to which the given UE is moving, registering a link defined by the extracted first source TA and the first extracted target TA;

assigning a link strength indicative of a frequency at which UE's are travelling a link in question; and building a table of links and associated link strengths in the network;

the method further comprising for a given UE when performing a TA update procedure and upon moving from a second source TA to a second target TA:

investigating, based on at least the location of at least one of the second source TA and the second target TA; and one or more probable travel paths potentially comprising a series of interconnected links and originating in either the second source TA or the second target TA;

the probable travel paths being selected by taking into account the strength of the associated links in the table;

the probable travel paths moreover being selected by taking into account the limit of a TA list length applying for the UE in question; and generating a TA list comprising the TA's constituted by the probable travel paths.

2. The method according to claim 1, comprising:

updating at least a mobility list weight parameter (TA_LIST_W) for the mobility behaviour of a UE; and generating the TA list length for the UE according to the updated mobility list weight parameter, such that a mobility list weight which is larger than a predetermined value generates a first TA list length while a mobility list weight which is smaller than said predetermined value generates a second TA list length being shorter than the first TA list length.

3. The method according to claim 2, wherein the mobility list weight parameter for mobility behaviour is based on at least the frequency at which a UE has completed at least one of:
  a TA update;
  a paging for the UE; and
  a serving request for the UE.

4. The method according to claim 3, wherein:
  at a serving request, if a current and last TA are not equal, meaning the UE has moved, the TA_LIST_W is updated with a higher value;
  at paging, if a current and last TA is not equal, the TA_LIST_W is decreased; and
  at TA update, in case of current and last TA not equal, the TA_LIST_W is increased.

5. The method according to claim 1, wherein list length is further restricted to a value between 1 and a predetermined upper maximum list length.

6. The method according to claim 1, wherein the TA list length is a predetermined fixed length for all UE's in the network.

7. The method according to claim 1, wherein the second source TA is added to the TA list, if the second source TA and the second target TA have a relation such that a link strength value exists for the link.

8. The method according to claim 1, wherein the table entries are reduced over time such that links which are used less frequently are deleted from the table.

9. The method according to claim 1 comprising the step of, for a given next TA under investigation and when generating the TA list comprising the TA's constituted by the probable travel paths, examining the corresponding links and the step of finding the strongest link, and after having found such a strongest link, subsequently dividing the strongest link strength with a predetermined value.

10. A mobility management node comprising a processing unit, a memory and an interface unit, the mobility management node being adapted for collecting mobility data of user entities (UEs) in a mobile communication network comprising a plurality of cells, wherein at least one cell or a group of cells are forming a tracking area (TA) in which, when paging of a given UE is to be undertaken, paging of the given UE is undertaken;
  wherein at least the mobility management node is further adapted for holding a TA list for a given UE defining a larger paging area in which, when paging of the given UE is to be performed, paging is performed throughout the area and in which TA update need not be undertaken by the UE in question before moving out of said area; the UE being required to perform a TA update procedure if moving out of the larger paging area;
  the mobility management node further being adapted for:
  continuously registering mobility events pertaining to a plurality of UE's in the network, wherein for each of the plurality of UE's,
  extracting a first source TA, being a TA a given UE visited, and a first target TA, being a TA to which the given UE is moving;
  registering a link defined by the extracted first source TA and the first extracted target TA;
  assigning a link strength indicative of a frequency at which UE's are travelling a link in question; and
  building a table of links and associated link strengths in the network; the mobility management node further being adapted to, for a given UE when performing a TA update procedure and upon moving from a second source TA to a second target TA:
  investigate, based on at least the location of at least one of the second source TA and the second target TA; and
  one or more probable travel paths potentially comprising a series of interconnected links and originating in either the second source TA or the second target TA;
  the probable travel paths being selected by taking into account the strength of the associated links in the table;
  the probable travel paths moreover being selected by taking into account the limit of a TA list length applying for the UE in question; and
  the mobility management node further being adapted to:
  generate a TA list comprising the TA's constituted by the probable travel paths.

11. The mobility management node according to claim 10, adapted for:
  updating at least a mobility list weight parameter (TA_LIST_W) for the mobility behaviour of a UE; and
  generating the TA list length for the UE according to the updated mobility list weight parameter, such that a mobility list weight which is larger than a predetermined value generates a first TA list length while a mobility list weight which is smaller than said predetermined value generates a second TA list length being shorter than the first TA list length.

12. The mobility management node according to claim 11, wherein the mobility list weight parameter for mobility behaviour is based on at least the frequency at which a UE has completed at least one of:
  a TA update;
  a paging for the UE; and
  a serving request for the UE.

13. The mobility management node according to claim 12, the mobility management node further being adapted for:
  at a serving request, if a current and last TA is not equal, meaning the UE has moved, the TA_LIST_W is updated with a higher value;
  at paging, if a current and last TA is not equal, the TA_LIST_W is decreased; and
  at TA update, in case of current and last TA not equal, the TA_LIST_W is increased.

14. The mobility management node according to claim 10, wherein list length is further restricted to a value between 1 and a predetermined upper maximum list length.

15. The mobility management node according to claim 10, wherein the TA list length is a predetermined fixed length for all UE's in the network.

16. The mobility management node according to claim 10, wherein the second source TA is added to the TA list, if the second source TA and the second target TA have a relation, such that a link strength value exists for the link.

17. The mobility management node according to claim 10, further being adapted for reducing the table entries over time such that links which are used less frequently are deleted from the table.

18. The mobility management node according to claim 10 further being adapted for, for a given next TA under investigation and when generating the TA list comprising the TA's constituted by the probable travel paths, examining the corresponding links and the step of finding the strongest link, and after having found such a strongest link, subsequently dividing the strongest link strength with a predetermined value.

* * * * *